March 31, 1936.  W. BELLINGHAUSEN  2,036,012
SLICING MACHINE
Filed July 7, 1933   3 Sheets-Sheet 2
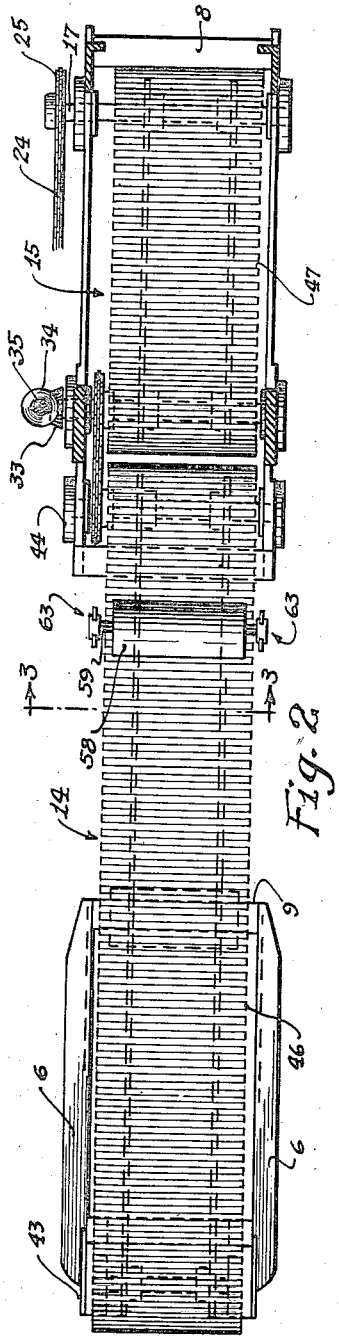
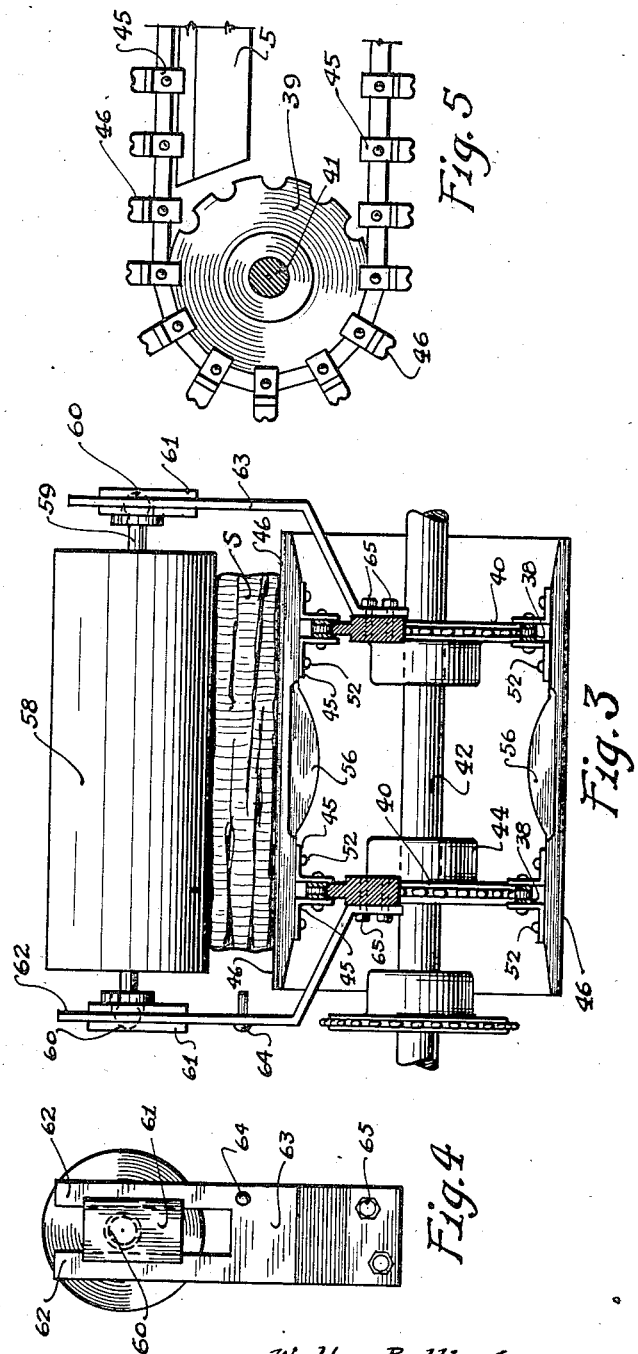
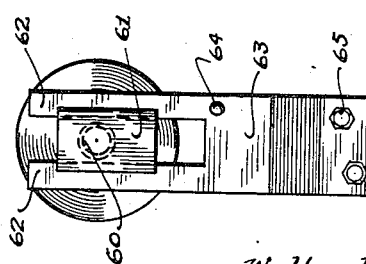
Walter Bellinghausen
INVENTOR
WITNESS
BY
ATTORNEY

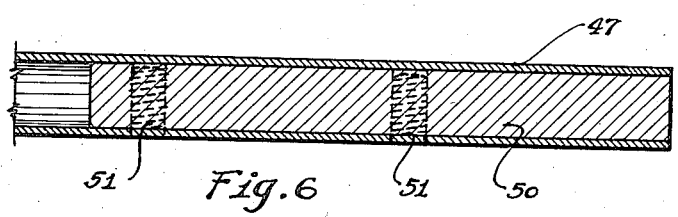
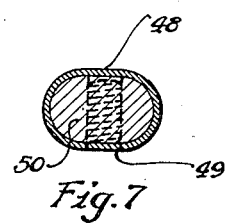
Fig.6  Fig.7
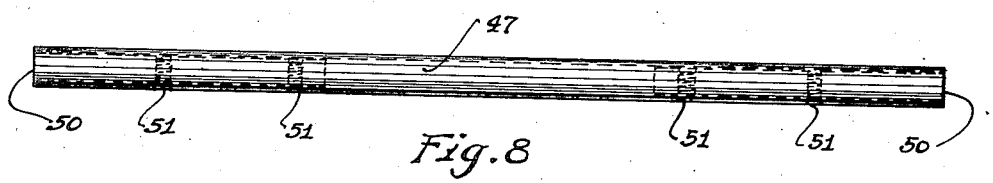
Fig.8
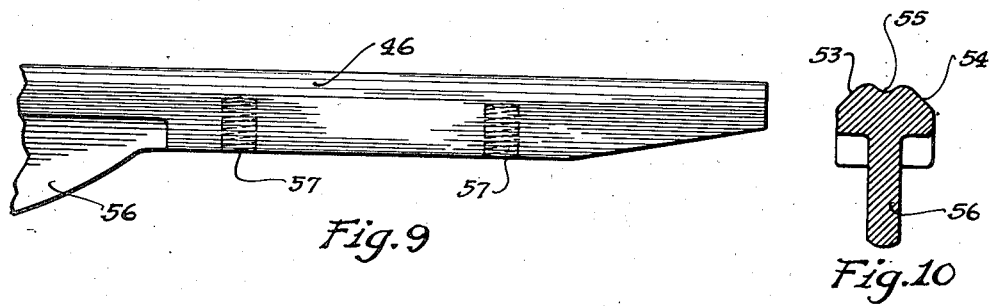
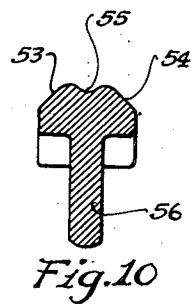
Fig.9  Fig.10
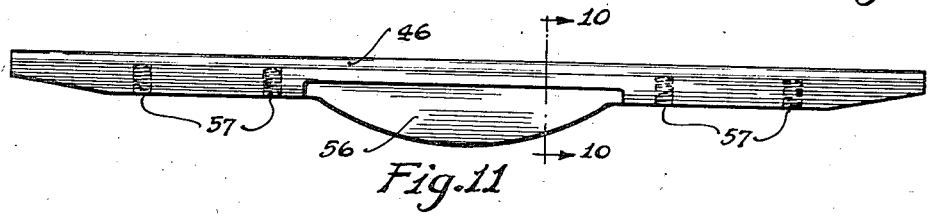
Fig.11
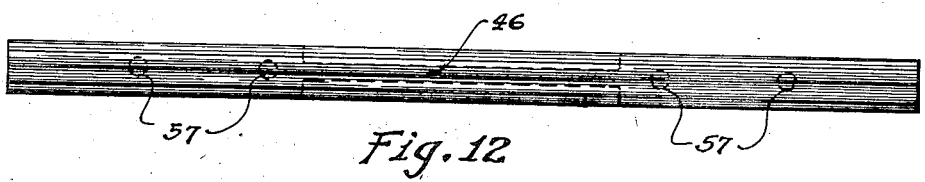
Fig.12

Patented Mar. 31, 1936

2,036,012

UNITED STATES PATENT OFFICE 2,036,012

SLICING MACHINE

Walter Bellinghausen, Chicago, Ill., assignor to Industrial Patents Corporation, Chicago, Ill., a corporation of Delaware Application July 7, 1933, Serial No. 679,322

21 Claims. (Cl. 146—110)

The invention relates to slicing machines and particularly to the feeding means thereof whereby slabs of bacon or other meat are fed one after the other in a forwardly longitudinal direction to and under the influence of a transversely operating cutting knife or cutting element whereby slices are severed one after the other from the slab thus fed to the knife or cutting element.

If the slabs of bacon are successively fed one after the other to the knife without the ends of the slabs being placed in firm abutting engagement with each other there is experienced a greater number of seconds or imperfect slices than is the case where the slabs of meat, as bacon slabs, are successively fed to the cutter under conditions whereby the slabs have this firm abutting arrangement.

One object of the present invention is to construct the feeding means so that it comprehends two main parts or two main conveying means, namely, a forward or front part or conveying element, sometimes referred to as front conveying means, and a rear part or rear conveying element, sometimes referred to as rear conveying means, and to operate these parts or conveying elements in such a manner that the rear conveying element travels at a faster rate of speed than does the front conveying element and to construct the rear conveying element so that slabs of meat, and particularly slabs of bacon, can be forcibly fed in a forwardly longitudinal direction towards and against and in abutting relationship with respect to a previously fed slab which is then being conveyed and fed by the forward conveying element.

The rear conveying element is constructed so as to have a ribbed or fluted upper surface portion and it preferably has associated therewith an upwardly or vertically yieldable pressing member in the form of a roller arranged above the forward end thereof whereby the slabs being fed by the rear conveying member and under this roller can be "pushed up" into relatively firm positive engagement with the slab immediately ahead of the same whereby the desired abutment of one end of the slab against the preceding slab is readily realized.

It must be recognized that if a conveying element has a smooth flat supporting surface material being fed thereby can readily slip relative thereto as forward movement of the material is opposed and it will also be recognized that if too positive a means is provided for impelling forward movement of material on the supporting surface that the material being conveyed might be mutilated, scraped or otherwise injured if its forward movement should become opposed.

Another object of the present invention is to provide this faster moving rear conveyor with a rib-like or fluted surface such as is provided by suitably constructed, longitudinally spaced, transversely extending, supporting rods or bars that have meat engaging surfaces thereof constructed so as to provide positive forward movement of the slab being conveyed until a certain degree of resistance is encountered and so that thereafter a slippage can take place between the conveying member having these surface providing rods and the slab thereupon whereby any undue buckling of the slab can be prevented and whereby this slippage can take place without scraping, cutting or otherwise damaging the slab of bacon or other material on the conveyor.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

As illustrating certain specific embodiments of the invention reference will now be made to the drawings forming a part of this specification and in which drawings Figure 1 is a vertical longitudinal sectional view of a bacon slicing machine having a frame, a transversely operable cutter carried by the frame at the forward end of the machine, a front conveying means providing a forward feeding means carried by the frame and located immediately behind the cutter, and a rear conveying means, the latter of which operates or travels at a faster rate of speed than does the front conveying means. In this figure there is shown a yieldable holding down roller that transversely extends over the forward end of the rear conveyor element.

Fig. 2 is a plan view of the machine shown in Fig. 1.

Fig. 3 is a vertical transverse view of the rear conveying means of the machine and is a view taken as on the plane indicated by the lines 3—3 of Fig. 2 looking in the direction of the arrows and in this Fig. 3 the relationship of the yieldable holding down roller in reference to the transversely extending supporting bars of the rear conveying element is brought out.

Fig. 4 is a detail view showing the means whereby the holding down roller is held in operative position in respect to the movable elements of the rear conveying element.

Fig. 5 is a longitudinal sectional view of an end portion only of the rear conveying element.

Figure 1:
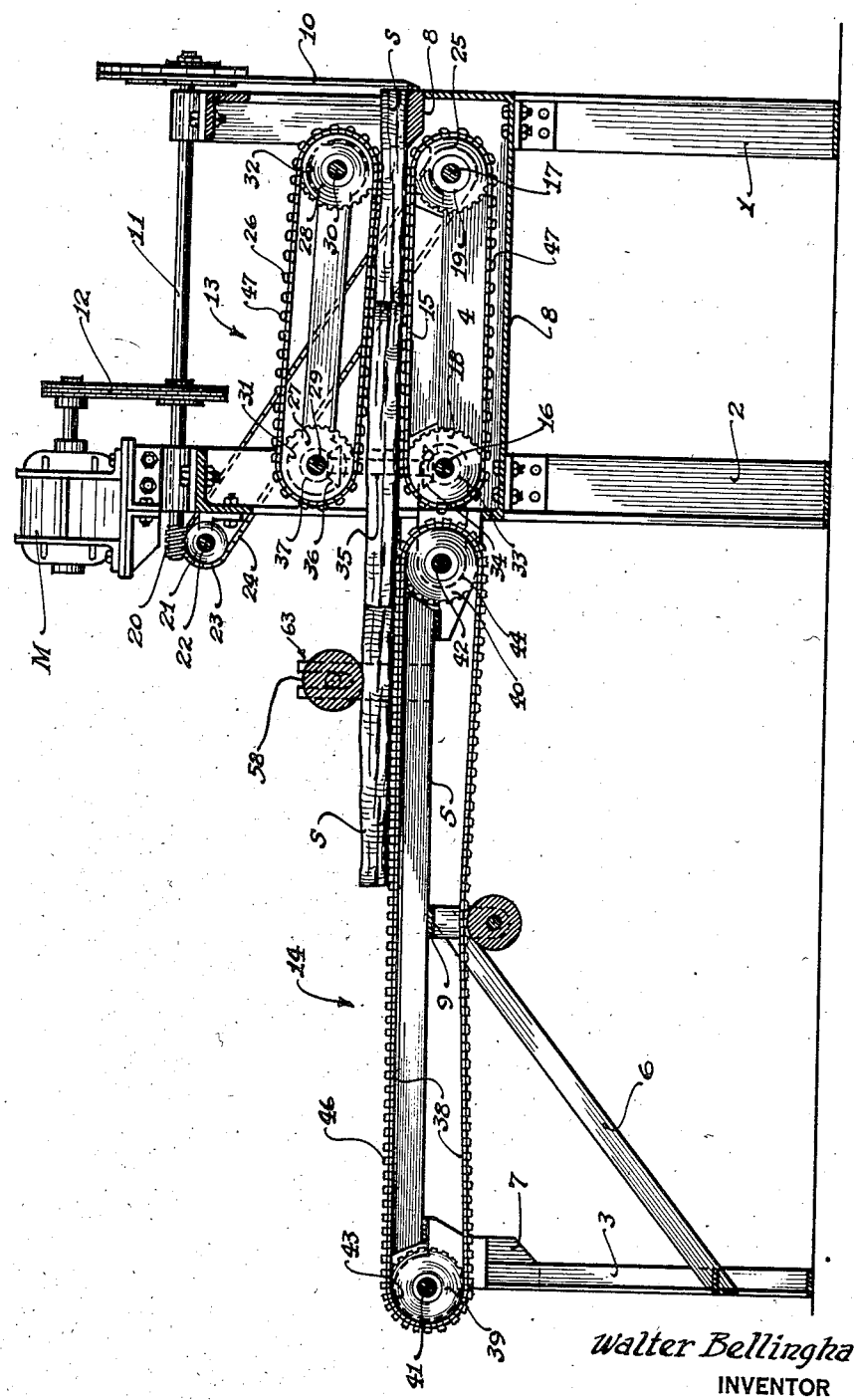

In Figures 3, 4 and 5 the parts are shown at a somewhat larger scale than in Figs. 1 and 2.

Figs. 6 to 12 are detail views of different forms of rods which may be employed to provide the supporting surface of the rear conveying element.

Reference will now be made to the drawings in detail.

The frame of the machine comprises any suitable construction and as shown comprises uprights such as 1, 2 and 3, longitudinal members such as 4 and 5, braces or brace portions 6 and 7, and transversely extending portions as 8 and 9. A transversely extending rotatable cutting element or knife 10 is located at the forward end of the frame or at the forward end of the machine and operates to sever successively one after the other slices of bacon or other meat from a slab as S as fed thereto in a longitudinally forward direction by suitable feeding mechanism with which the machine is provided. This cutter is carried by shaft 11 suitably mounted in bearings on the frame of the machine and is continuously driven from the motor M by suitable gearing or other mechanism designated by 12.

The feeding means or mechanism whereby the slabs of meat are fed in a forwardly longitudinal direction comprises a forward conveying means or conveying mechanism broadly designated by 13 and a rear conveying means or conveying mechanism broadly designated by 14. The conveying means 14 is arranged longitudinally behind or in the rear of the forward conveying means 13 and travels at a faster rate of speed than does the forward conveying means and both the front and rear conveying means cooperate in feeding slabs in a forwardly longitudinal direction to the cutter.

The forward conveying means 13 comprises a lower continuous or endless conveyor element or member 15 suitably supported on the frame through the medium of shafts 16 and 17 and sprockets 18 and 19 and is driven from the motor through the medium of cutter shaft 11 by suitable mechanism which comprises such parts as worm 20, worm wheel 21 driven thereby, shaft 22, sprocket wheel 23, chain 24 and sprocket wheel 25 on shaft 17.

Above this lower conveying element 15 there is located an upper continuously traveling endless or continuous member 26 which may be considered as providing an upper continuously moving forward conveying member the main function of which is to hold a slab or slabs of bacon in firm feeding engagement with the lower continuously traveling conveying element or member 15. This upper continuously traveling conveying element 26 is carried by sprockets 27 and 28 that are in turn mounted on shafts 29 and 30 which are in turn mounted in bearings 31 and 32 and which are positionable in respect to the main frame whereby the upper forward conveyor element 26 can be properly positioned in respect to the lower conveyor element 15. The shaft 29 of the upper front or forward conveyor is driven from the shaft 16 of the lower front or forward conveyor 15 through any suitable gearing comprising gears 33 and 34, shaft 35, gear 36 mounted on the shaft 35, and gear 37 mounted on shaft 29.

The rear conveying means 14 comprises endless chains 38 mounted to travel on sprockets 39 and 40 which are respectively carried on shafts 41 and 42 mounted in suitable bearings as 43 and 44 carried by the main frame of the machine. There is secured in any suitable manner to the links of the endless chain 38 intermediate connecting members as 45, clearly shown in Fig. 3, and through the medium of these intermediate members 45 there is held in place in longitudinally spaced relationship a series of transversely extending supporting bars or rods 46, as is clearly indicated in Figs. 1, 3 and 5. By this assemblage of the transversely extending bars there is in effect provided what may be considered as a fluted or ribbed construction for the slab supporting surface of the conveyor 14 and an inspection of Fig. 5 shows that the forward and rear edges of each of these bars have an easy slope from the transverse central portions of the bars towards the chains thus avoiding any transversely extending sharp edges. In Figs. 6 to 12 different forms of bars are shown.

In the form of transversely extending bar shown in Figs. 6, 7 and 8 it will be noted that the same is provided by employing a tubular construction 47 flattened at the top and bottom as at 48 and 49. This tubular bar which may be made from an aluminum tubing is also provided at the ends thereof with filler members 50 having screw threaded openings at 51 by which the bar is secured in place, (see Fig. 3) through the medium of bolts or screws 52. In the form of bar shown in Figs. 9 to 12—which as a matter of fact is the bar 46 shown in Fig 3—it will be observed that the top or supporting surface of the bar is bevelled off at 53 and 54 and it is also provided with a longitudinally extending groove 55 along its intermediate meat supporting surface.

For the purpose of adding strength to the bar a depending rib is provided at 56. This bar is also provided with screw receiving openings at 57, whereby the rods can be held in place by the screws or bolts 52, previously referred to and shown in Fig. 3. These bars may be made of aluminum or any other suitable material.

Reference has heretofore been made to the pressing roller or pressing means which is located above and at the forward end of the continuously moving conveying element of the rear feeding means. This pressing roller is designated by 58. It is mounted so that it revolves about a transversely extending axis and has axles or trunnions 59 the ends 60 of which are ball shape and are seated in spherical sockets in bearing members 61 which are slidably mounted in vertically extending guideways 62 provided in and by the bracket or bearing positioning members 63. One or both of the bracket members 63 are provided with an opening into and through which a guide stud 64 is located for controlling the lowermost position of the roll. Brackets 63 are held in place by bolts or screws 65. This holding down roll, as the name implies, functions to press a slab of bacon downwardly against the supporting surface of the rear conveying means but it will be noted that the roller is mounted so as to permit vertical yieldable movement in a direction away from the conveying mechanism whereby the roller can position itself according to the thickness and general configuration of that portion of the slab passing thereunder and in respect to which the roller has pressing engagement. It will therefore be seen that the function of this holding down roll is to bear down on the top of the slabs of bacon or other meat being fed, and it automatically rises and tilts to suit the thickness and shape of the bacon or other material being fed and revolves freely at all times due to the bearings working up and down loosely in the slotted brackets.

The weight of the holding down roller tends to press the slabs of bacon or other material into or against the grooved or fluted bars which in turn grip the bacon and push the end tight or in firm engagement with the preceding slab due to the fact that the rear conveyor which is sometimes herein termed the "push-up" conveyor is traveling faster than the forward conveyor. It will also be noted that the bars, as previously indicated, are designed so that should the end pressure tend to become too great slippage can take place thus preventing buckling of the slab and the slippage thus permitted enables the continued functioning of the rear conveyor without scraping, cutting or otherwise damaging the slab thereupon.

It will be thus seen that the rear conveyor 14 effects a firm abutting of one slab against the other and the front conveying mechanism is constructed so that the abutting slabs are well retained in their abutting position between the upper supporting strand of the lower front conveyor element 15 and the lower strand of the upper front conveyor element 26.

It will be noted that when the bars of Figs. 6 to 8 or when the bars of Figs. 9 to 12 are assembled as shown in Fig. 1 to provide the surface of the meat engaging and supporting surfaces of the "push-up" or rear conveying member there is effected a supporting surface for the conveyor which may be considered of the washboard type. In other words this washboard surface of the conveyor provides sufficient protuberances and recesses for creating a frictional resistance sufficient to effect the desired pushing up of the end of one slab of bacon against the preceding slab but this washboard surface is free or devoid of any sharp protuberances or projections with the result that when slippage of the conveyor under the pushed up slab of meat takes place no damage or injury is encountered by either the conveyor or the meat slab thereupon.

What is claimed is:

1. In combination in a meat slicing machine having a frame, a transversely operable knife located at the forward end portion of the frame, means carried by said frame for supporting and operating said knife, a conveying means for feeding slabs of meat in a longitudinal direction forwardly to and under the operating influence of said knife whereby slices can be transversely severed one after the other from a meat slab thus fed to the knife as the knife operates, and means for causing said feeding means to operate in synchronism with the movements of said knife, said slicing machine being characterized in that said conveying means comprises a lower continuously moving front conveyor element providing at the upper portion thereof a longitudinally extending slab engaging and feeding portion, an upper continuously moving front conveyor element providing at the lower portion thereof a longitudinally extending slab engaging portion, means for causing said longitudinally extending slab engaging portions of said upper and lower conveyor elements to move at the same rate of speed in a forwardly direction so as to feed a bacon slab to and under the cutting influence of said knife, a continuously moving rear conveying element providing at the upper portion thereof a slab engaging and feeding portion, means for operating said rear conveying element at a faster rate of speed than the forward conveying element so as to cause the slab being conveyed by the rear conveying element to forcibly engage the end portion of a slab which is being fed by the forward conveying elements and maintain a continuous uninterrupted forward pressure against the slab being cut, and pressing down means located over and near the forward end of the rear conveying element for pressing a slab downwardly against the rear conveying element while the slab is being fed by the latter.

2. In operative combination in a meat slicing machine, a frame, a transversely operable knife located at the forward end portion of the frame, means carried by said frame for supporting and operating said knife, a front conveying means for feeding slabs of meat in a longitudinal direction forwardly to and under the operating influence of said knife whereby slices can be transversely severed from said meat slab one after the other as said knife operates, a rear conveying means for feeding slabs of bacon one after the other to said front conveying means, and operating means for simultaneously moving said front and rear conveying means, which operating means comprises gearing whereby the rear conveying means feeds slabs at a faster rate of speed to the front conveying means than the front conveying means feeds slabs to said knife; which said front conveying means comprises a lower continuous conveyor element that provides an upper longitudinally extending slab engaging and feeding portion, an upper continuous conveyor element that provides a lower longitudinally extending slab engaging portion, and means for causing said longitudinally extending slab engaging portions of said upper and lower conveyor elements to move at the same rate of speed and in a forwardly direction; which said rear conveying means comprises a rear continuous conveyor element and pressing down means located over and near the forward end of the rear continuous conveyor element so as to press slabs being fed by the rear conveyor element downwardly against the latter but which pressing down means is mounted so as to permit vertical yielding movement according to the thickness of the meat slabs being fed.

3. In combination in a meat slicing machine a frame, a transversely operable knife located at the forward end portion of the frame for transversely severing meat slices from a slab longitudinally fed in a forwardly direction to and under the operating influence of said knife, means carried by said frame for supporting and operating said knife, a front conveying means for feeding the slab of meat in said forwardly longitudinal direction to and under the operating influence of said knife, a rear or "push-up" conveying means for feeding slabs of meat to said front conveying means at a faster rate of speed than that of the slab being fed by the front conveying means and maintaining a continuous uninterrupted forward pressure against the slab being cut, a cylindrical holding down roller arranged near the forward end of said rear conveying means, which holding down roller is mounted so as to revolve about a transversely extending axis and is mounted so as to provide a vertically yieldable downward pressing member for holding a slab of meat in forcible engagement with and on said rear conveying means, and common operating means for said front and rear conveying means, said machine also having pressing down means arranged in operative position over said front conveying means.

4. In combination in a meat slicing machine a frame, a transversely operable knife located at the forward end portion of the frame, means carried by said frame for supporting and operating said knife, a front conveying means for feeding slabs of meat in a longitudinal direction forwardly to and under the operating influence of said knife, a rear conveying means which operates at a faster forward speed than the front conveying means, and pressing down means located over and near the forward end of the rear conveying means for yieldably pressing slabs of meat downwardly against the supporting and feeding surface of the rear conveying means, said rear conveying means having the supporting and feeding portions thereof provided by a series of transversely extending bars or supporting rods having a surface which in a longitudinal direction provides a smooth receding sloping portion for both the front and rear edges thereof.

5. In a combination as defined in and by the claim last preceding certain transversely extending bars or supporting rods each of which is provided with a transversely extending groove along the intermediate supporting surface portion thereof.

6. A meat slicing machine having in operative combination a frame, a transversely operable knife located at the forward end portion of the frame for transversely severing meat slices from a slab longitudinally fed in a forwardly direction to and under the operating influence of said knife, a front conveying means for feeding the slab of meat in said forwardly longitudinal direction to and under the operating influence of said knife, a rear or "push-up" conveying means for feeding slabs of meat to said front conveying means at a faster rate of speed than that of the slab being fed by the forward conveying means, means for operating said knife, said front conveying means and said rear conveying means in synchronized relationship, and holding down means arranged near but over the forward end of said rear conveying means.

7. A meat slicing machine having in operative combination the parts referred to and defined in and by the claim last preceding and in which the rear conveyor means comprises transversely spaced endless chains providing parts of continuous conveying elements that travel over supporting and driving sprockets and to which endless chains there is secured transversely extending bars the top or meat supporting surface of which bars are longitudinally sloped so as to provide receding edges whereby scraping, cutting or other damage is avoided should the transversely extending bars be caused to slip below and under a slab when supported thereupon.

8. A meat slicing machine having in operative combination the parts referred to and defined in and by claim 8 and in which the rear conveying means comprises endless chains constituting continuous conveying elements and to which there is secured transversely extending bars providing top or meat engaging surfaces which are longitudinally sloped so as to effect receding edges whereby scraping, cutting or other damage is avoided should the transversely extending bars be caused to slip below and under a slab of meat when supported thereupon and which bars have grooved portions extending transversely along the intermediate meat supporting surface thereof.

9. In a meat slicing machine, a frame, a cutting element, a forward feeding means to feed meat slabs to the cutting means including upper and lower superposed substantially horizontally disposed coacting endless conveyors to receive between them the slabs to be fed, and a rear feeding means having a ribbed surface, said ribs having surfaces formed with protuberances and recesses for creating frictional resistance and said rear feeding means operating at a faster rate of speed than the forward feeding means to feed a slab of meat into firm abutting end to end relation with a meat slab between the opposed laps of the endless conveyors constituting the feeding means and maintain a continuous uninterrupted forward pressure against the slab being cut.

10. In a meat slicing machine, a frame including a transverse bar at the forward end of the frame, a cutting element mounted on the frame to operate contiguous to said bar, a meat slab feeding means including superposed traveling endless conveyors to receive the slabs for feeding between them, the upper lap of the lower endless conveyor running horizontally in substantially horizontal alignment with said transverse bar and close thereto, and rear feeding means having a ribbed surface, said ribs having surfaces formed with protuberances and recesses for creating frictional resistance and said rear feeding means cooperating with said feeding means to mechanically feed a slab of meat between the lower lap of the upper endless conveyor and the upper lap of the lower endless conveyor into firm abutting end to end relation with a slab between said conveyors, said rear feeding means traveling at a faster rate of speed than the first mentioned feeding means to maintain a continuous uninterrupted forward pressure against the slab being cut.

11. In a meat slicing machine, a frame, a cutting element, a forward traveling feeding means to feed slabs of meat to the cutting means, a rear traveling feeding means cooperating with the forward feeding means to feed a slab of meat into firm abutting end to end relation with a meat slab on the traveling forward feeding means, said rear feeding means traveling at a faster speed than the front feeding means to maintain a continuous uninterrupted forward pressure against the slab being cut, and a presser roller vertically and rotatably mounted on the frame above the meat slab on said rear feeding means to exert pressure on such slab to maintain the slab in feeding contact with the rear feeding means.

12. In a meat slicing machine, a frame, a cutting element, a forward feeding means to feed the material to the cutting element, means spaced slightly longitudinally of the forward feeding means to feed the material to the forward feeding means and operable at a faster speed than the speed of the forward feeding means to maintain a continuous uninterrupted forward pressure against the slab being cut including a member having spaced transversely disposed bars thereon, the bars each having a longitudinal groove in its upper face and sloping faces on opposite sides of the groove, and a presser roll slidably and rotatably mounted on the frame over the slab of meat on the said feeding means member to rise and fall and rotate according to the thickness and surface of the meat slab and thereby yieldably press the meat slab on the bars thereunder which bars in turn grip the slab to facilitate the feeding of the slab forwardly to the forward feeding means.

13. In a meat slicing machine, a frame, a cutting element, a forward feeding means to feed the material to the cutting element, rear feeding means to feed the material to the forward feeding means including a member having spaced transversely disposed bars thereon, and a presser roll slidably and rotatably mounted on the frame over the slab of meat on the said feeding means member to rise and fall and rotate according to the thickness and surface of the meat slab and thereby yieldably press the meat slab on the bars thereunder which bars in turn grip the slab to facilitate the feeding of the slab forwardly to the forward feeding means, said rear feeding means traveling at a faster rate of speed than the forward feeding means to maintain a continuous uninterrupted forward pressure against the slab being cut.

14. In a meat slicing machine, a frame, a cutting element, a feeding means for feeding slabs of meat to the cutting element, including a ribbed member, oppositely disposed bracket arms secured to the frame and having oppositely disposed slots, a plate slidable over the outer face of each of said slots of the respective bracket arms and each plate having a socket on its inner face, and a roller between said bracket arms having trunnions slidable in the slots of said arms and provided with spherical outer ends fitting in the sockets of said plates, the roller being adapted to press upon the upper face of the meat slab to press the same onto the ribs of said ribbed member to facilitate the feeding of the meat slabs by said feeding means.

15. In a meat slicing machine, a frame, a cutting element, a feeding means for feeding slabs of meat to the cutting element including a movable ribbed member, oppositely disposed bracket arms secured to the frame and having oppositely disposed slots, a plate slidable on each bracket arm over the slot thereof and each having a socket, and a presser roller between said bracket arms and having trunnions extending through the respective slots of the arms and having spherical outer ends fitting in the sockets of said plates, the roller being adapted to press upon the upper face of the meat slab to press the same onto the ribs of said ribbed member to facilitate the feeding of the meat slabs by said feeding means.

16. In a meat slicing machine, a frame, a cutting means, a feeding means whereby to feed meat slabs to the cutting means, oppositely disposed bracket arms secured to the frame and having oppositely disposed slots, a plate slidable on each bracket arm over the slot thereof and each having an inwardly opening socket, and a presser roller having trunnions extending through the respective slots of said arms and having spherical outer ends fitting in the sockets of said plates, the roller cooperating with said means to feed the meat slabs to facilitate the feeding of the slabs.

17. In a meat slicing machine, a frame, a cutting means, means for feeding material to the cutting means, and a presser means for engagement with the material as it is fed to the cutting means, including a roller, means for slidably mounting said roller over the material, and a ball and socket mounting between the ends of the roller and said slidable mounting means whereby to permit slidable and rotative movement of the roller as the material is fed under it to the cutting means.

18. In a meat slicing machine, a frame, a cutting means, means for feeding material to the cutting means, including substantially horizontally disposed upper and lower superposed endless conveyors arranged with their inner laps running relatively close together, each endless conveyor being composed of endless chains connected by transversely disposed relatively close together ribs, the ribs each having rounded surface edges to prevent injury to the material and the forward ends of the conveyors operating relatively close to the cutting means, and a horizontally disposed feeding means cooperating with the first named feeding means and having its upper lap in substantially the same horizontal plane as the upper lap of the lower aforesaid feed conveyor and traveling at a faster rate of speed than the upper and lower superposed endless conveyors to feed material in abutting relation to and between said upper and lower conveyors to the cutting means and maintain a continuous uninterrupted forward pressure against the slab being cut.

19. In a meat slicing machine, a frame, a cutting means, traveling means for the support of meat slabs for movement to the cutting means, means cooperating with and traveling at a faster speed than said meat supporting means to support and feed a meat slab into abutting end to end relation with a slab on said supporting means to forcibly push the latter slab flatwise over said traveling supporting means to the cutting means to be sliced and maintain a constant uninterrupted forward pressure against the slab being cut, means yieldably pressing the slab on said first mentioned traveling supporting means into moving engagement therewith as said slab is being pushed to the cutting means for slicing purposes, and means operating over said second mentioned supporting means to press yieldably on the slab thereon as such slab pushes the forward slab to the cutting means.

20. In a meat slicing machine, a frame, a cutting means, a traveling forward means to support a slab of meat and feed it horizontally flatwise to the cutting means, a rear supporting and feeding means cooperating with the forward supporting and feeding means to support and feed a slab of meat flatwise horizontally substantially in alignment with the slab on the forward supporting and feeding means and operating at a faster speed than the latter to force the forward end of the slab on the rear supporting and feeding means into abutting pushing engagement with the rear end of the slab on the forward supporting and feeding means, and maintain a constant uninterrupted forward pressure against the slab being cut, means to yieldably press the slab on the forward supporting and feeding means, and means to yieldably press the slab on the rear supporting and feeding means as the slabs are fed to the cutting means.

21. A meat slicing machine having a cutter at the forward end thereof, a forward traveling conveying mechanism and a rear traveling conveying mechanism which travels in horizontal relation with the forward conveying mechanism and at a faster rate of speed than the forward conveying mechanism to forcibly feed a slab of meat to the forward conveying mechanism into firm end abutting relation with a meat slab on the forward conveying mechanism to maintain a continuous uninterrupted forward pressure against the slab being cut, said rear conveying mechanism provided with a washboard surface upon which meat slabs are supported when being conveyed, and means including a roller for pressing slabs of meat downwardly against the washboard supporting surface.

WALTER BELLINGHAUSEN.

CERTIFICATE OF CORRECTION.

Patent No. 2,036,012.  March 31, 1936.

WALTER BELLINGHAUSEN.

It is hereby certified that error appears in the printed specification of the above numbered patent requiring correction as follows: Page 4, first column, line 58, claim 8, for the numeral "8" read 6; and that the said Letters Patent should be read with this correction therein that the same may conform to the record of the case in the Patent Office.

Signed and sealed this 28th day of April, A. D. 1936.

(Seal)

Leslie Frazer
Acting Commissioner of Patents.